United States Patent [19]
Nanno et al.

[11] Patent Number: 5,555,773
[45] Date of Patent: Sep. 17, 1996

[54] PARKING BRAKE SYSTEM

[75] Inventors: Kunio Nanno; Atsushi Mori; Akinori Sugimoto, all of Wako, Japan

[73] Assignee: Honda Giken Kogyo Kabushiki Kaisha, Tokyo, Japan

[21] Appl. No.: 261,768

[22] Filed: Jun. 16, 1994

[30] Foreign Application Priority Data

Jun. 16, 1993 [JP] Japan .................. 5-145200

[51] Int. Cl.6 .................................................. G05G 1/14
[52] U.S. Cl. .................. 74/512; 74/526; 74/560; 74/562; 74/575
[58] Field of Search ............... 74/512, 516, 518, 74/526, 560, 562, 562.5, 567, 575, 576, 577 R; 188/2 D

[56] References Cited

U.S. PATENT DOCUMENTS

| | | |
|---|---|---|
| 3,875,820 | 4/1975 | Morden .................. 74/625 |
| 4,391,159 | 7/1983 | Sellmeyer ................ 74/516 |
| 4,604,913 | 8/1986 | Kyonomine ............... 74/516 |

*Primary Examiner*—Charles A. Marmor
*Assistant Examiner*—Chong H. Kim
*Attorney, Agent, or Firm*—Armstrong, Westerman, Hattori, McLeland & Naughton

[57] ABSTRACT

A brake pedal operated manually by the driver, a driving arm connected to a brake cable, and a ratchet wheel driven by a motor are rotatably supported on a pedal shaft. A ratchet member, mounted on the driving arm, is meshed with the ratchet wheel. When the brake pedal is depressed in a direction A, the brake pedal and the driving arm are coupled to each other through a limiting device and the driving arm, with a locking recess $35_1$ urged by a locking pin, is turned in the direction A to operate a brake. When the driving arm is otherwise turned in the direction A, only the arm is turned in the direction A, with the brake pedal separated by the limiting device being left at the brake operating position and prevents the operating foot from being caught between the pedal and vehicle body while such driving arm is otherwise turned and such brake is applied.

9 Claims, 13 Drawing Sheets

PARKING BRAKE SYSTEM

FIELD OF INVENTION

The present invention relates to a parking brake system which is operable by manually operating a brake operating member by a driver, and operable by automatically operating the brake operating member by a drive source.

BACKGROUND OF THE INVENTION

A parking brake system, conventionally used for a vehicle, is designed to be manually operated by a driver. More specifically, it is operated by operating a brake pedal with a driver's foot, or by operating a brake lever with a driver's hand.

If the parking brake system is designed to be operated electrically, it is possible to automatically operate the parking brake system by detecting operational conditions (e.g., waiting for a signal, and the like), thereby providing an elimination, or reduction, of labor for a driving operation and a simplification of the driving operation.

However, for example, if the brake pedal is operated electrically, there is a possibility for a driver's foot to be caught between the brake pedal and a vehicle body panel.

The present invention has been accomplished with the above circumstance in view, and to provide a parking brake system operable by operating the brake operating member by the drive source, wherein a driver's foot, or hand, is prevented from being caught between the brake pedal and the vehicle body panel.

To achieve such a parking brake system, according to a first feature of the present invention, there is provided a parking brake which is operable by manually operating a brake operating member by a driver, and operable by automatically operating the brake operating member by a drive source, wherein the system comprises limited means for limiting the movement of at least a portion of the driver operated brake operating member, when such brake operating member is automatically operated by the drive source.

According to a second feature of the invention, in addition to the first feature, a driving member connected to the drive source and the brake operating member can engage with and disengage from each other through a locking member, and during automatic operation, limited means releases the locking connection through the locking member to separate the driver operated brake operating member from the driving member.

According to a third feature of the invention, in addition to the first feature, the driver operated brake operating member comprises a base end-side member connected to the drive source, and a tip end-side member operated by a driver, the base end-side and tip end-side members being pivotally supported by a folding shaft. During automatic operation, the limited means permits the tip end-side member to be folded about the folding shaft.

BRIEF DESCRIPTION OF THE DRAWINGS

The invention is more completely described and will be later understood from the following description taken with the appended drawings, in which.

DESCRIPTION OF THE INVENTION

Figure 1:
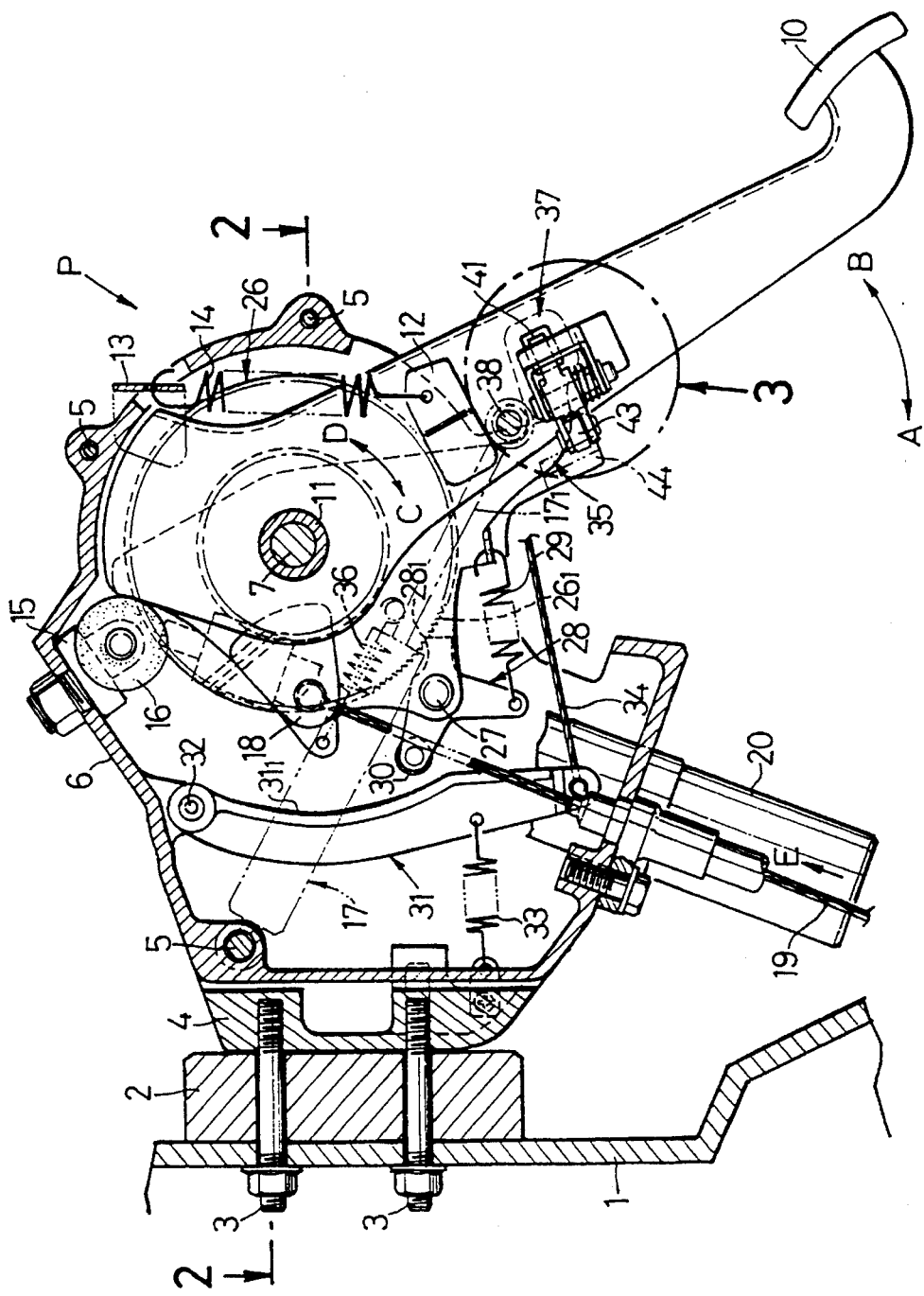
FIG. 1 is a side view, partly in section, of the entire parking brake system according to a first embodiment and taken along line 1—1 in FIG. 2.
Figure 2:
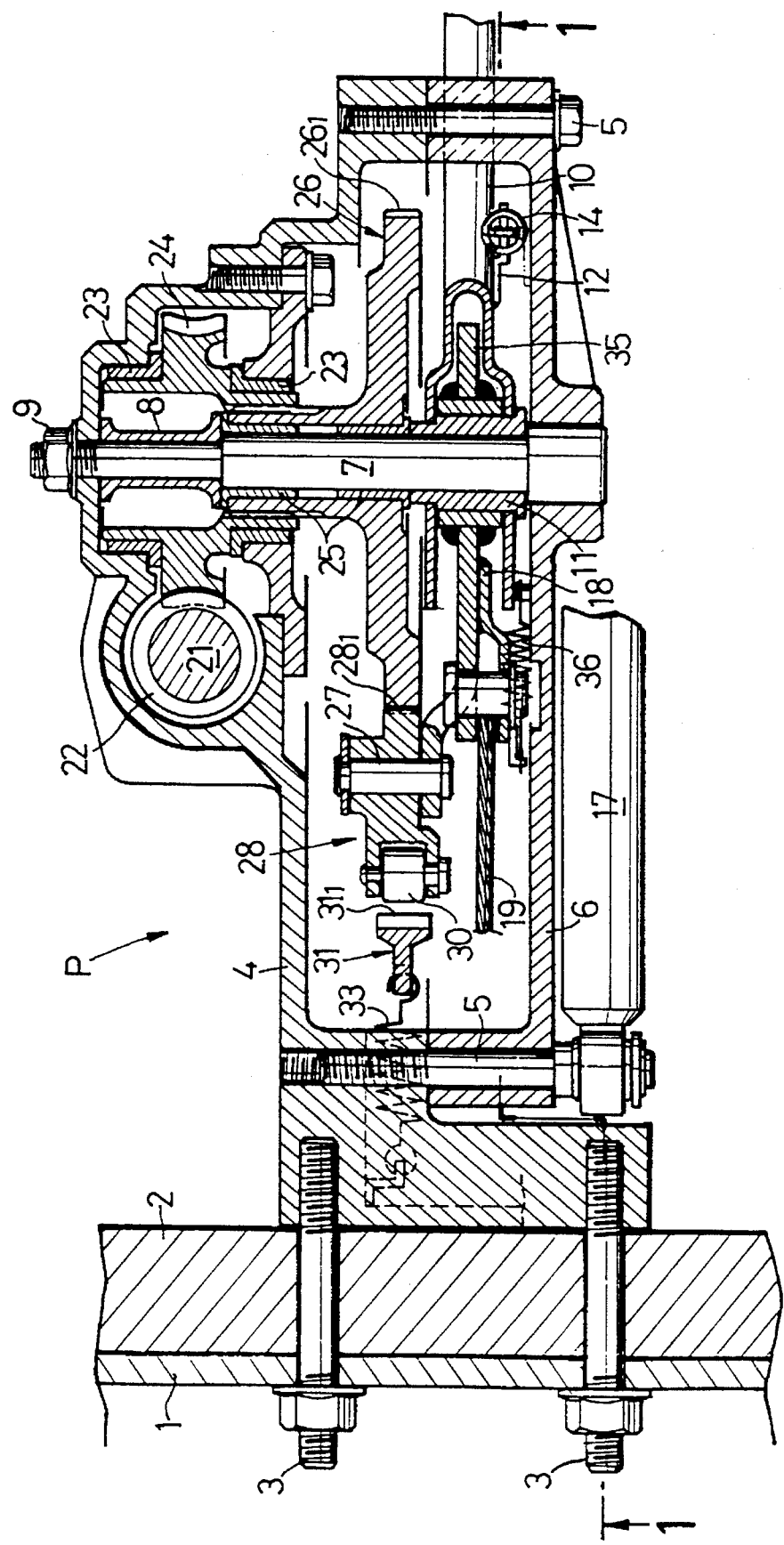
FIG. 2 is a sectional view taken along line 2—2 in FIG. 1.

As shown in FIGS. 1 and 2, a parking brake system P includes a casing 4 fixed to a vehicle body panel 1 by two bolts 3, 3 through spacer 2, and a casing 6 coupled to casing 4 by a plurality of bolts 5. A pedal shaft 7 is mounted between casings 4 and 6, FIG. 2, and is secured to casing 4 through a collar 8 and a nut 9. A brake pedal 10, manually operated by a driver's foot, is rotatably supported on a left end of the pedal shaft 7 through metal bearing 11. The brake pedal 10 is formed into a shape having a U-shaped section. A driving arm 35 is rotatably supported on the pedal shaft 7 through metal bearing 11, so that it can be fitted into a space within brake pedal 10. The brake pedal 10 and the driving arm 35 are rotatable relative to each other.

A pedal return spring 14 is stretched between bracket 12 mounted on brake pedal 10 and bracket 13 mounted on casing 6. Brake pedal 10 is biased in a direction indicated by arrow B by resilient force of the spring 14 and stopped at a shown inoperative position in which it abuts against a stopper roller 16 supported on casing 6 through a bracket 15. In order to limit abrupt return of brake pedal 10 by pedal return spring 14, brake pedal and the bolt 5 coupling casings 4 and 6 are interconnected through a damper 17 extending along an outer side of the casing 6.

A brake cable 19 is fastened at one end thereof to a bracket 18 mounted on the driving arm 35. If the driving arm 35 is turned in a direction indicated by an arrow A against a resilient force of a driving-arm return spring 36, the brake cable 19 is pulled in a direction indicated by an arrow E to operate a rear brake assembly, not shown.

A worn gear 22, FIG. 2, is fixed to an output shaft 21 of a motor 20 mounted on casing 4. The worm gear 22 is meshed with a worn wheel 24 supported within casing 4 in a coaxial rotation to the pedal shaft 7 through a pair of metal bearings 25, 25 and is spline coupled to the worn wheel 24.

A ratchet member 28 is pivotally supported on the driving arm through a pin 27, so that it is biased by a ratchet return spring 29, FIG. 1, stretched between the ratchet member 28 and the driving arm 35. The ratchet member 28 has a ratchet claw $28_1$, engaging ratchet teeth $26_1$ formed around an outer periphery of the ratchet wheel 26. If the driving arm 35 is turned in the direction of the arrow A, the ratchet claw $28_1$ is slid relative to the ratchet teeth $26_1$ of the ratchet wheel 26. If the ratchet wheel 26 is turned in a direction of an arrow C, the ratchet claw $28_1$ is brought into engagement with the ratchet teeth $26_1$, so that the driving arm 35 is pulled by the ratchet wheel 26 and turned in the direction of the arrow A.

In order to urge roller 30, mounted in the ratchet member 28, to move the ratchet claw $28_1$ away from the ratchet teeth $26_1$, a release arm 31, having a cam surface $31_1$, capable of abutting against the roller 30, is pivotally supported on the casing 4 through a pin 32. The release arm 31 is biased, in a direction away from the roller 30, by a release arm return spring 33. The release arm 31 is connected, through a release cable 34 to a release lever (not shown) mounted within a compartment and driven in a direction to abut against the roller 30. The distance between the pin 32 and a fastened point of the release cable 34 is set at a value larger than the distance between the pin 32 and the cam surface $31_1$ in order to reduce the load required for a releasing operation.

Figure 3:
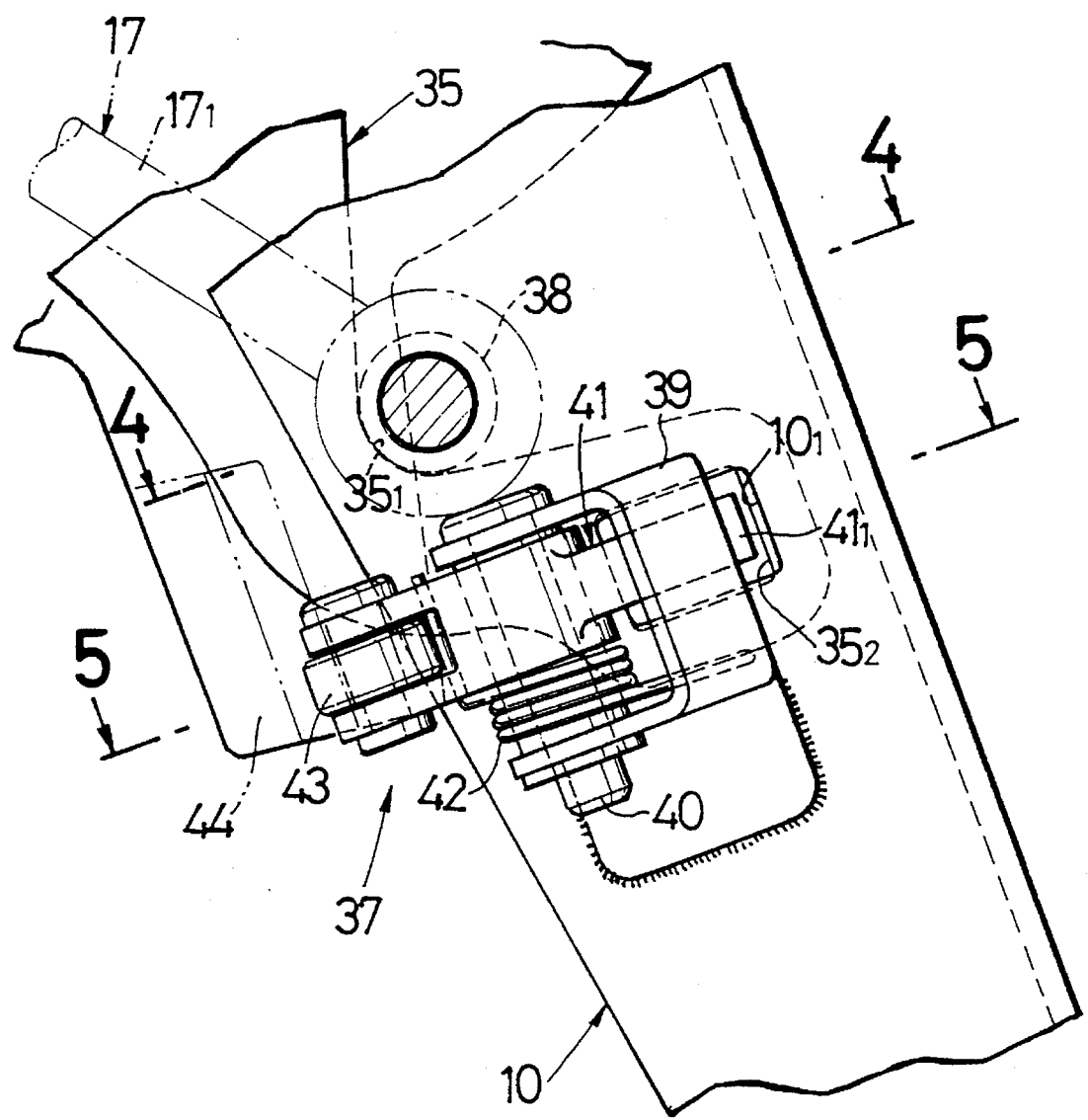
FIG. 3 is an enlarged view of a portion indicated in the circle at 3, FIG. 1.
Figure 4:
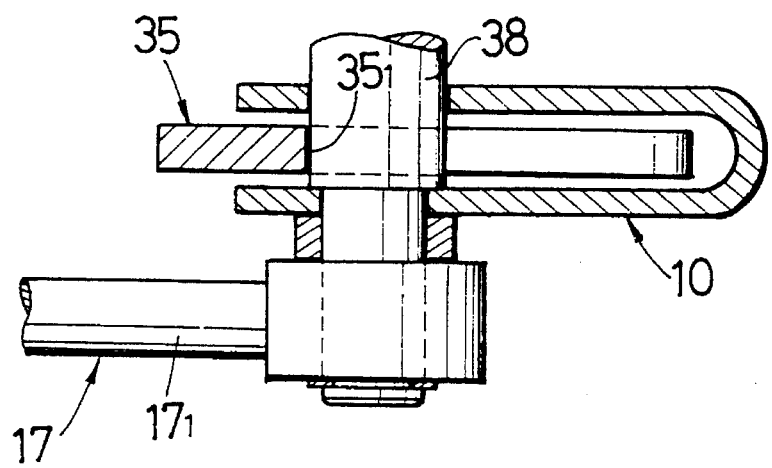
FIG. 4 is a sectional view taken along line 4—4 in FIG. 3.
Figure 5:
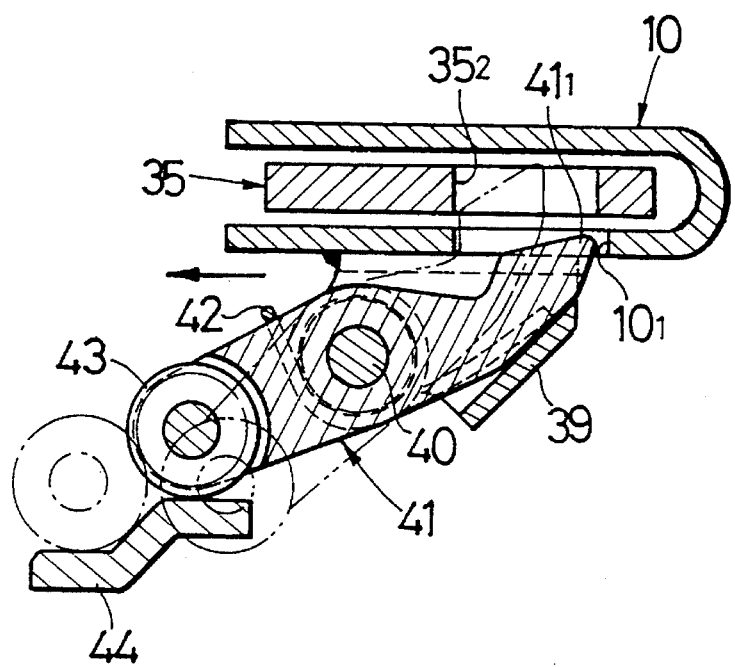
FIG. 5 is a sectional view taken along line 5—5 in FIG. 3.

The structure of a limited means 37, provided between the brake pedal 10 and the driving arm 35, will be described below in connection with FIGS. 3 to 5. The limiting means 37 is composed of a locking hook 41, a spring 42, a roller 43 and a cam member 44, described hereinafter.

The brake pedal 10 is provided with a locking pin 38 by which a rod $17_1$ of the damper 17 is pivotally supported. The driving arm 35 is provided with a locking recess $35_1$ capable of being engaged by the locking pin 38. Thus, when the brake pedal 10 is turned in the direction of the arrow A, FIG. 1, the driving arm 35, with the locking recess $35_1$ urged to the locking pin 38 of the brake pedal 10, is also turned in the direction of the arrow A.

The locking hook 41 is pivotally supported through a pin 40 on a U-shaped bracket 39 mounted on one side of the brake pedal 10. The locking hook 41 is biased in a counterclockwise direction, as viewed in FIG. 5, by the spring 42, so that the hook portion $41_1$ formed at one end of the locking hook 41, can be advanced into an opening $10_1$, defined in the brake pedal 10, to engage a locking bore $35_2$ defined in the driving arm 35. The roller 43 is mounted at the other end of the locking hook 41 and biased, by the spring 42, to abut against the cam member 44 mounted on casing 6. When the brake pedal 10 and the driving arm 35 are in their inoperative positions, shown in FIG. 1, the locking hook 41 is swung to a position, shown by a solid line in FIG. 5, by the cam member 44, thereby causing the brake pedal 10 and the driving arm 35 to be separated from each other.

The operation of the first embodiment, having the above-described construction, will be described below.

To manually operate the parking brake system P, the brake pedal 10 may be depressed by the driver's foot, as in a usual parking brake system. When the brake pedal 10 has been depressed and turned in the direction of the arrow A, the driving arm 35, with the locking recess $35_1$ urged to the locking pin 38 of the brake pedal 10, is turned in the direction of the arrow A in unison with the brake pedal 10. During this time, the ratchet claw $28_1$, of the ratchet member 28 mounted on the driving arm 35, is slid along the ratchet teeth $26_1$ of the ratchet wheel 26 which is in a stopped state.

When the driver releases his foot from the brake pedal 10, after depression of the brake pedal 10 from the inoperative position shown in FIG. 1 to an operative position, the brake pedal 10 is intended to be returned in the direction of the arrow B by the resilient force of the pedal return spring 14. However, at the time of the turning movement of the brake pedal 10, in the direction of arrow A, the locking hook 41, with the roller 43 guided by the cam member 44, is turned in the counterclockwise direction, as viewed in FIG. 5, so that the hook portion $41_1$ is brought into engagement with the locking bore $35_2$ in the driving arm 35 by the resilient fore of the spring 42 to connect the brake pedal 10 and the driving arm 35 with each other. Moreover, the ratchet member 28, mounted on the driving arm 35, is swung from a position shown by a dashed line in FIG. 6 to a position shown by a solid line by the resilient force of the ratchet return spring 29, so that the ratchet claw $28_1$ thereof is brought into engagement with the ratchet teeth $26_1$ of the ratchet wheel 26, thereby causing the brake pedal 10 and the ratchet wheel 26 to be united. As a result, even if the ratchet wheel 26 is intended to be turned in a direction indicated by an arrow D along with the brake pedal 10, the turning movement of the ratchet wheel 26 in the direction of the arrow D, i.e., the turning movement of the brake pedal 10 in the direction of the arrow B, is limited, and the brake pedal is locked at the operative position shown, because the worm wheel 24, integral with the ratchet wheel 26, has been meshed with the worm gear 22 of the motor 20.

Figure 6:
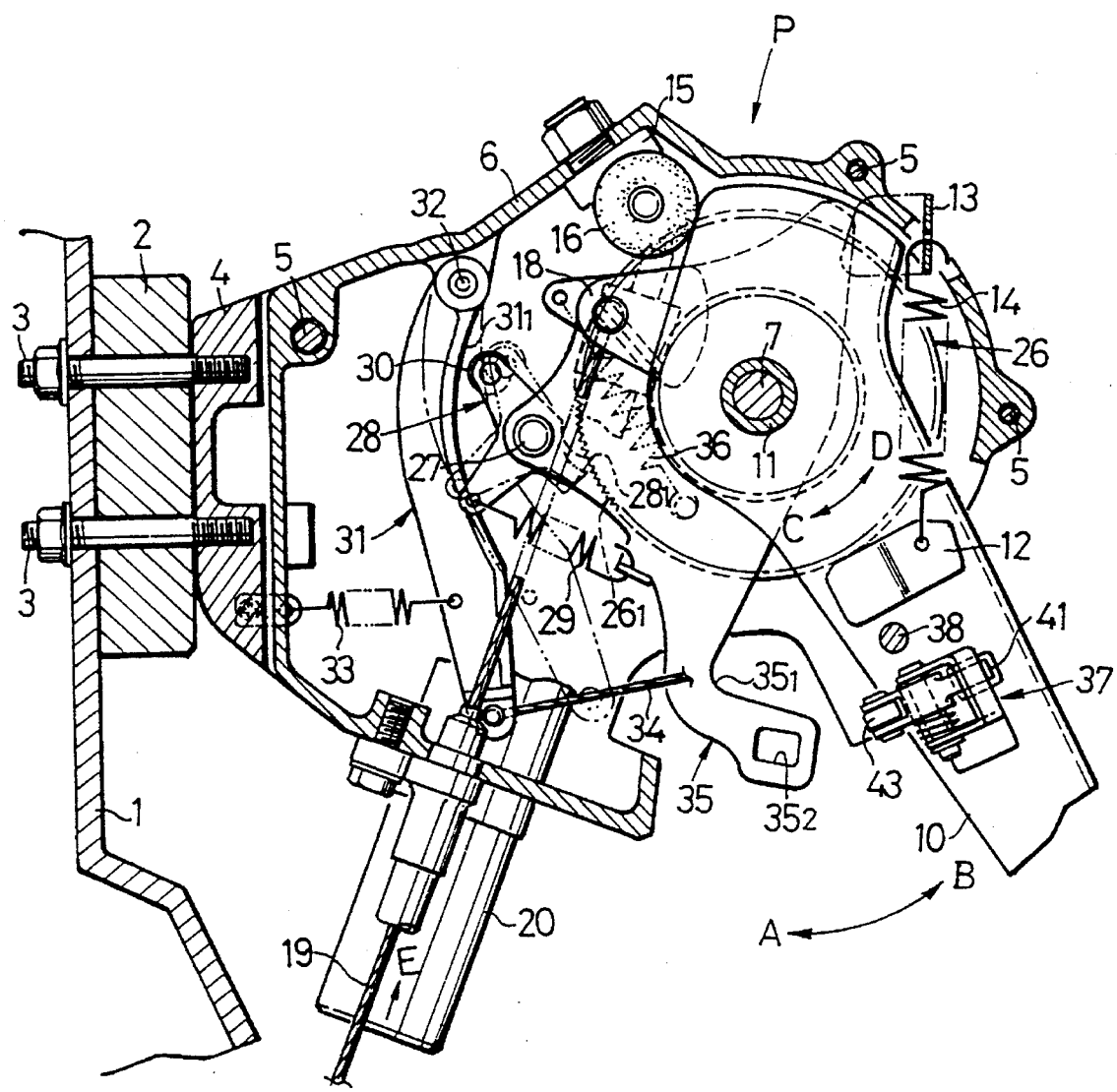
FIG. 6 is a view similar to FIG. 1 for explaining the operation.

If the driver has operated a switch (not shown), or a command signal is delivered from an electronic control unit in order to electrically operate the parking brake system, the motor 20 is driven. The rotation of the motor 20 is transmitted, through the worm gear 22 and the worm wheel 24, to the ratchet wheel 26 to turn the ratchet wheel 26 in the direction of arrow C. When the ratchet wheel 26 has been turned in the direction of the arrow C, the driving arm 35 is also turned in the direction of the arrow A through the ratchet member 28 having the ratchet claw $28_1$ engaging the ratchet teeth $26_1$ of the ratchet wheel 26. However, the hook member 41 is retained at the position shown by the solid line in FIG. 5 by the cam member 44 at this time and hence, with the brake pedal left at the inoperative position, only the driving arm 35 is turned to the operative position, as shown in FIG. 6. Thus, in electrically operating the parking system P, the driver's foot is prevented from being caught between the brake pedal 10 and the vehicle body panel 1.

When the driving arm 35 has reached the operative position shown in FIG. 6, the driving of the motor 20 is stopped by a command from the electric control unit, for example, by detecting an increase in load of the motor 20. At this time, the brake pedal 10 is locked at the operative position, shown in FIG. 6, by meshing of the worm gear 22 with the worm wheel 24, as in the above-described manual operation.

When the brake pedal 10 is depressed, to increase the braking force of the parking brake system P after the driving arm 35 has reached the operative position shown in FIG. 6, by the operation of the motor 20 and has been locked at such operative position, the locking pin 38 of the brake pedal 10 urges the locking recess $35_1$ of the driving arm 35, thereby further turning the driving arm 35 in the direction C to enable an increase in braking force. At this time, the brake pedal 10 is locked at the depressed operative position by engagement of the hook portion 41 of the locking hook 41 of the brake pedal 10 with the locking bore $35_2$ in the driving arm 35.

When the release cable 34 is pulled, to manually release the operation of the parking brake system P, the release arm 31 is swung to the position shown by dashed line in FIG. 6 against the resilient force of the release return spring 33, so that the cam surface $31_1$ urges the roller 30 of the ratchet member 28. This causes the ratchet member 28 to be swung to the position shown by dashed line in FIG. 6 against the resilient force of the ratchet return spring 29, causing the engagement of the ratchet claw $28_1$ with the ratchet teeth $26_1$ to be released. As a result, the driving arm 35 is turned in the direction of the arrow B, FIG. 6, by the resilient force of the driving arm return spring 36 back to the inoperative position shown in FIG. 1. At this time, if the brake pedal 10 operated manually has been turned to the operative position along with the driving arm 35, the brake pedal 10 is returned to the inoperative position along with the driving arm 35 by the resilient force of the pedal return spring 14.

When the motor 20 is driven in a direction opposite from the above-described direction to electrically release the operation of the parking brake system P, the rotation of the motor 20 is transmitted through the worm gear 22 and the worm wheel 24 to the ratchet wheel 26 to turn the ratchet wheel 26 in the direction of arrow D. When the ratchet wheel 26 has been turned in the direction of the arrow D, the driving arm 35 is turned in the direction of the arrow B by the resilient force of the driving arm return spring 36 back to the inoperative position shown in FIG. 1, along with the ratchet member 28 having the ratchet claw $28_1$, engaging the ratchet teeth $26_1$ of the ratchet wheel 26. At this time, if the brake pedal 10, operated manually, has been turned to the operative position along with the driving arm 35, the brake pedal 10 is returned to the inoperative position along with the driving arm 35 by the resilient force of the brake pedal return spring 14.

Figure 7:
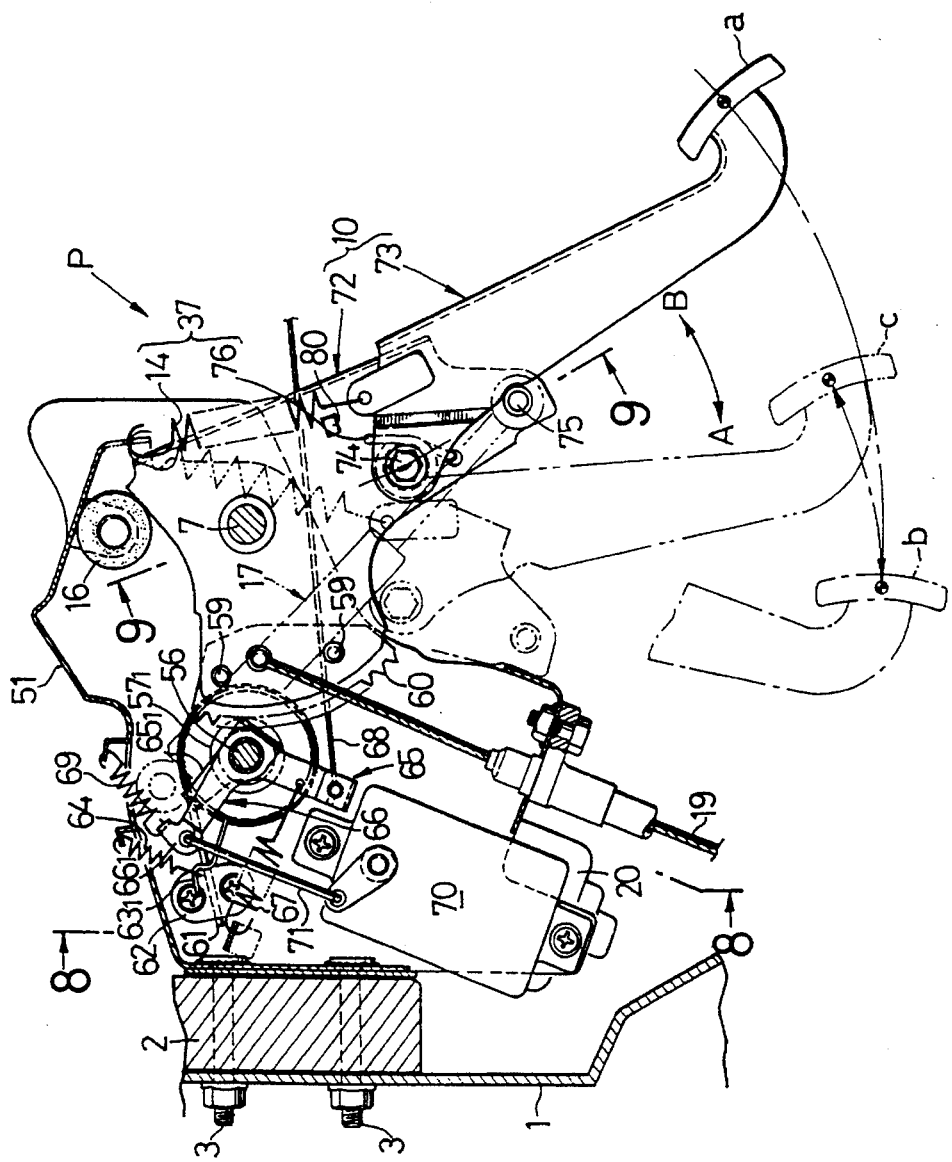
FIG. 7 is a side view, partly in section, of the entire parking brake system according to a second embodiment and taken along line 7—7 in FIG. 8.
Figure 8:
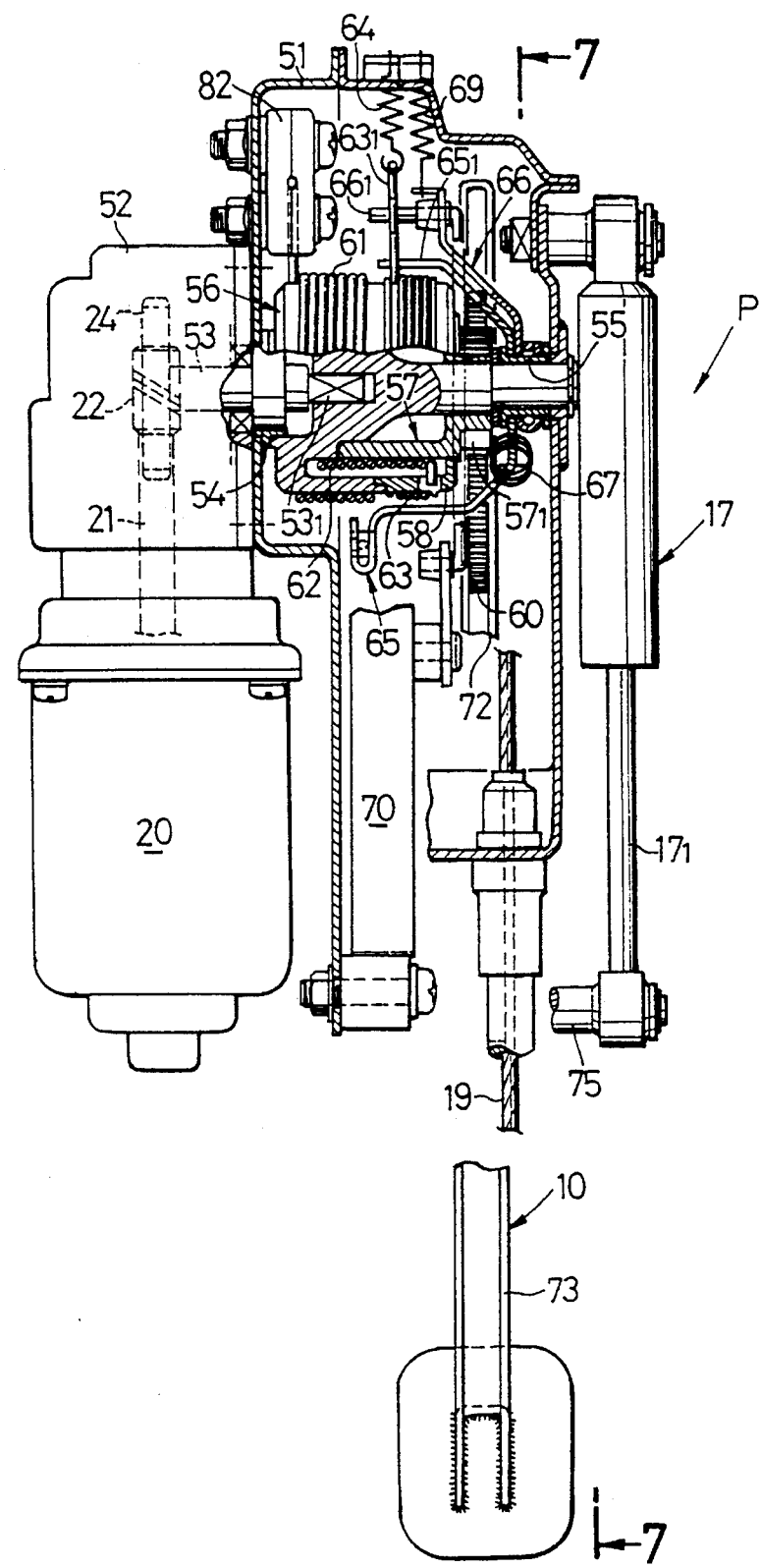
FIG. 8 is a sectional view taken along line 8—8 in FIG. 7.
Figure 9:
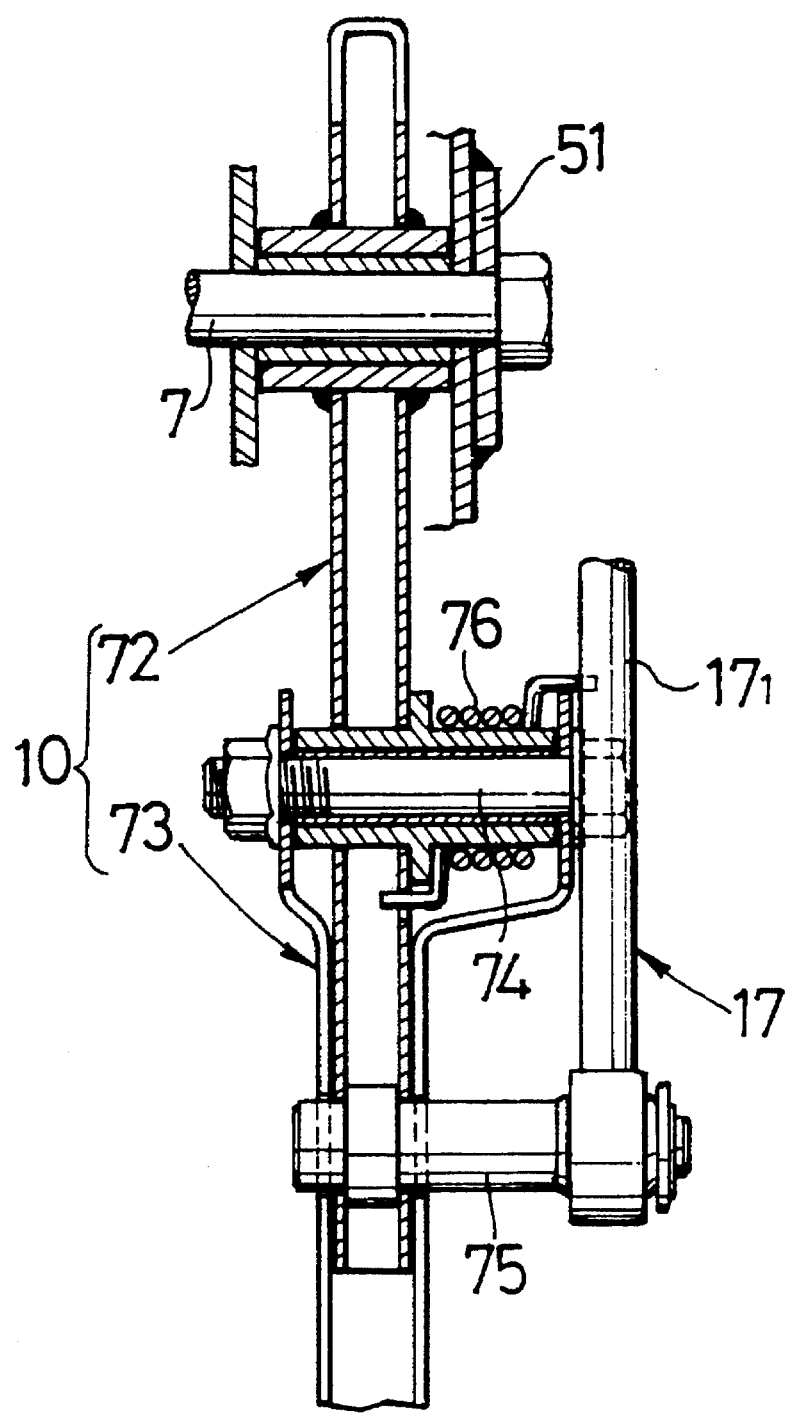
FIG. 9 is a sectional view taken along a line 9—9 in FIG. 7.

FIGS. 7 to 14 illustrate a second embodiment of the present invention. As shown in FIGS. 7 to 9, a brake pedal 10 is divided into two members: a base end-side member 72 and a tip end-side member 73. The base end-side member 72 is pivotally supported on the pedal shaft 7 and connected to a rear brake assembly (not shown) through a brake cable 19, and the tip end-side member 73 is pivotally supported on the base end-side member 72 through a folding shaft 74. An end of turning of the tip end-side member 73, in a direction of an arrow A, is defined by abutment of a front edge of the tip end-side member 73 against a pin 75 of a damper 17, connected to the base end-side member 72, to prevent an abrupt return of the brake pedal 10. An end of turning of the base end-side member 73, in a direction of an arrow B, is defined by a stopper 80 provided on the base end-side member 72.

The brake pedal 10 is biased in a direction to permit its upper end to abut against a stopper roller 16, by the action of a pedal return spring 14 stretched between the brake pedal 10 itself and a casing 51. The tip end-side member 73 is biased in a direction opposite from the pedal return spring 14 by a folding spring 76 mounted on the folding shaft 74. The resilient force of the folding spring 76 is set at a value larger than that of the pedal return spring 14 in an inoperative position shown by a solid line in FIG. 7. Thus, in the inoperative position, the tip end-side member 73 is in abutment against the pin 75 mounted on the base end-side member 72.

The pedal return spring 14 and the folding spring 76 constitute a limiting means 37 in the second embodiment.

A motor 20, FIG. 8, is supported on a sidewall of the casing 51 through a gear housing 52. The motor 20 has a worm gear 22 provided on an output shaft 21 thereof and meshed with a worm wheel 24 which is mounted on an input shaft 53 supported in the gear housing 52.

Figure 10:
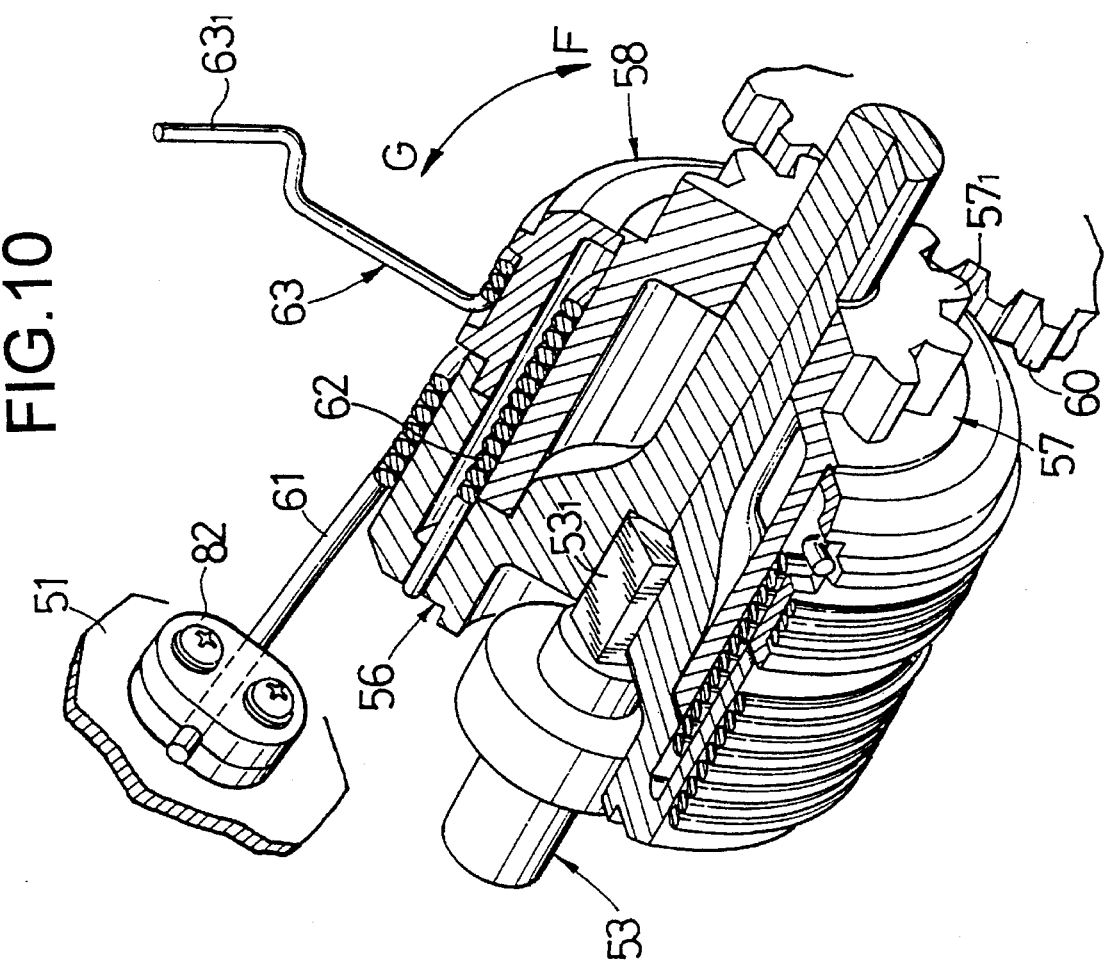
FIG. 10 is an enlarged view of an essential portion.
Figure 11:
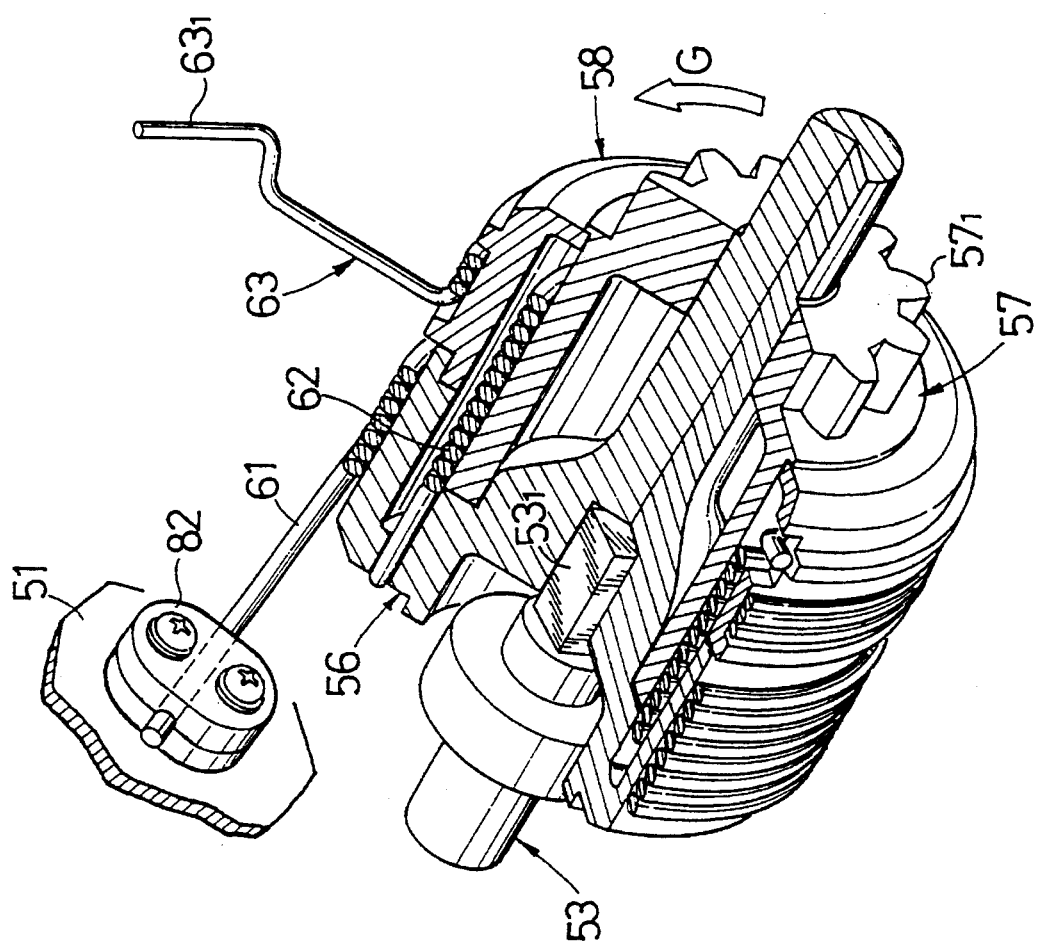
FIG. 11 is a view for explaining the operation when the brake is operated manually.

As can be seen from FIG. 8 and also from FIG. 10, a drive roller 56 is supported at its opposite ends thereof on the casing 51 through metal bearings 54 and 55 and is integrally coupled to the input shaft 53 through an angle shaft portion $53_1$. A driven roller 57 is coaxially and relatively rotatably carried on the drive roller 56, and a release roller 58 coaxially and relatively rotatably carried on the drive roller 56 and the driven roller 57. A pinion $57_1$ is integrally formed at a tip end of the driven roller 57 and meshed with a second gear 60 which is secured to the brake pedal 10 by two bolts 59, 59.

A clutch spring 61 is wound around an outer periphery of the drive roller 56. One end of the clutch spring 61 is free, and the other end is fixed to the casing 51 through a fixing member 82. When the drive roller 56 is rotated in a direction of an arrow F in FIG. 10, the clutch spring 61 is contracted in diameter to lock the rotation of the drive roller 56. When the drive roller 56 is rotated in a direction of an arrow G, FIG. 10, the clutch spring 61 is expanded in diameter to permit the rotation of the drive roller 56.

A drive lock spring 62 is wound around outer peripheries of the drive roller 56 and the driven roller 57. One end of the drive lock spring 62 is secured to the drive roller 56 and the other end is locked to the release roller 58. When the drive roller 56 is rotated in a direction of an arrow G, relative to the driven roller 57, or when the driven roller 57 is rotated in the direction of the arrow F, relative to the drive roller 56, the drive lock spring 62 is contracted in diameter to integrally couple the drive roller 56 and the driven roller 57. When the drive roller 56 is rotated in the direction of the arrow F relative to the driven roller 57, or when the roller 57 is rotated in the direction of the arrow G relative to the drive roller 56, the first lock spring 62 is expanded in diameter to permit the relative rotation between drive roller 56 and the driven roller 57.

A releasing lock spring 63 is wound around an outer periphery of the release roller 58. The releasing lock spring 63 has one end serving as a free end and the other end rising radially outwardly to serve as an operating end $63_1$. The operating end $63_1$ of the releasing lock spring 63 is biased in the direction of the arrow F by an diameter-expanding spring 64 which is stretched between the operating end $63_1$ and the casing 51, thereby permitting the releasing spring 63 to be expanded to retain the release roller 58 at an original position. When the operating end $63_1$ of the releasing lock spring 63 is moved in the direction of the arrow G, against a resilient force of the diameter-expanding spring 64, the releasing lock spring 63 is contracted in diameter to rotate the release roller 58 in the direction of the arrow G, so that the drive lock spring 62 locked at the other end thereof to the release roller 58 can be forcedly expanded, thereby bringing the drive roller 56 and the driven roller 57 into their relatively rotatable states.

In order to move the operating end $63_1$ of the releasing lock spring 63 in the direction of the arrow G, against the resilient force of the diameter-expanding spring 64, a manually releasing arm 65 and an automatically releasing arm 66 are relatively rotatably carried on an outer periphery of a shaft portion of the drive roller 56. The manually releasing lever 65 is biased in a clockwise direction, as viewed in FIG. 7, by a manually releasing lever return spring 67. When the manually releasing lever 65 is rotated in a counterclockwise direction, by a release cable 68 connected to a releasing lever, not shown, its engagement portion $65_1$ is brought into abutment against the operating end $63_1$ of the releasing lock spring 63 to move the operating end $63_1$ in the direction of the arrow G. The automatically releasing lever 66 is biased in the clockwise direction, as viewed in FIG. 7, by an automatically releasing lever return spring 69. When the automatically releasing lever 66 is rotated in the counterclockwise direction by an actuator 70 through a rod 71, its engagement portion $66_1$ is brought into abutment against the operating end $63_1$ of the releasing lock spring 63 to move the operating end $63_1$ in the direction of arrow G.

The operation of the second embodiment having the above-described construction will be described below.

When the tip end-side member 73 of the brake pedal 10 is depressed, and rotated in the direction of the arrow A from a position a to position b as shown in FIG. 7, in order to manually operate the parking brake system P, the base end-side member 72, with the pin 75 urged by the tip end-side member 73, is also turned in the direction of the arrow A. As a result, the driven roller 57, with the pinion $57_1$ meshed with the sector gear 60 provided on the base end-side member 72, is rotated in the direction of arrow G in FIG. 11. As the driven roller 57 is rotated in the direction of the arrow G, the drive lock spring 62 is expanded in diameter and hence, the driven roller 57 can be separated from the drive roller 56 and rotated without hindrance.

Figure 12:
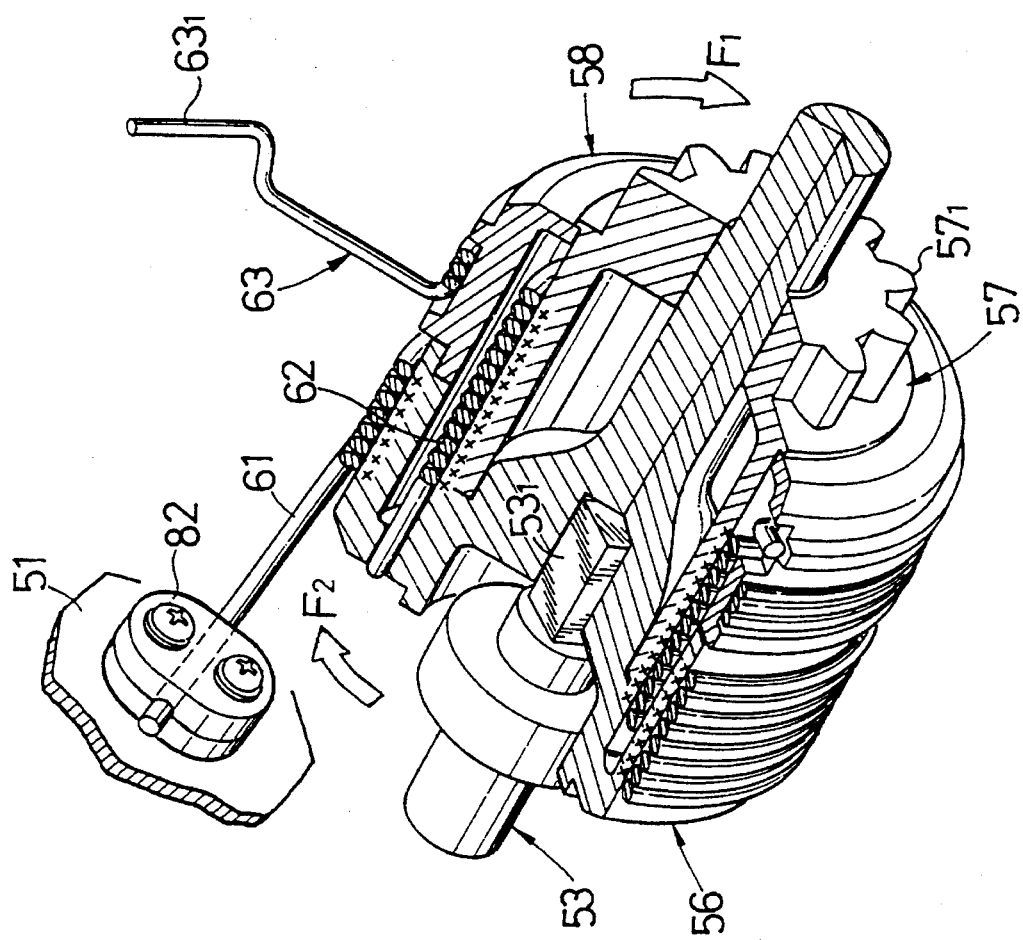
FIG. 12 is a view showing operation when the brake is maintained.

When the driver releases his foot from the brake pedal 10, after depression of the brake pedal 10, to the operative position b shown by the dashed line in FIG. 7, the brake pedal 10 is intended to be returned in the direction of the arrow B by the resilient force of the pedal return spring 14, and the driven roller 57 is intended to be rotated reversely in a direction of arrow $F_1$ in FIG. 12. However when the driven roller 57 is intended to be rotated in the direction of the arrow $F_1$, the drive lock spring 62 is contracted in diameter, thereby uniting the driven roller 57 and the drive roller 56, and arresting the drive roller 56 intended to be rotated in the direction of an arrow $F_2$ by the clutch spring 61. Thus, the base end-side member 72, of the brake pedal 10, is locked at the operative position. A mark X in FIG. 12 indicates fastening portion of the spring.

When the tip end-side member 73, of the brake pedal 10, has been depressed from the position a to the position b, as described above, the pedal return spring 14 is expanded largely and, hence, the resilient force thereof exceeds the resilient force of the folding spring 76. As a result, the tip end-side member 73, pulled by the pedal return spring 14, with the base end-side member 72 remaining at the operative position, is turned, in the direction of the arrow B, about the folding shaft 74 and stopped at a position c in which it abuts against the stopper 80 provided on the base end-side member 72.

Figure 13:
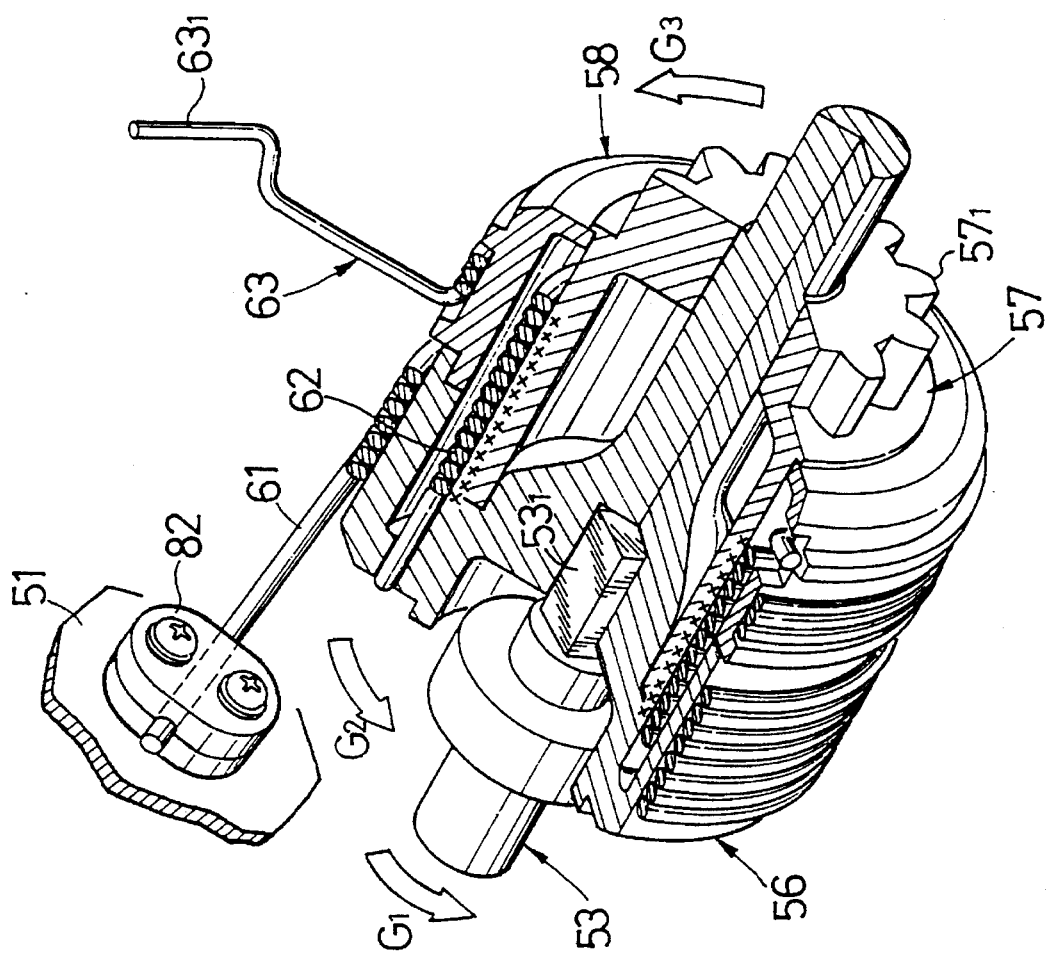
FIG. 13 is a view showing operation when the brake is operated electrically.
Figure 14:
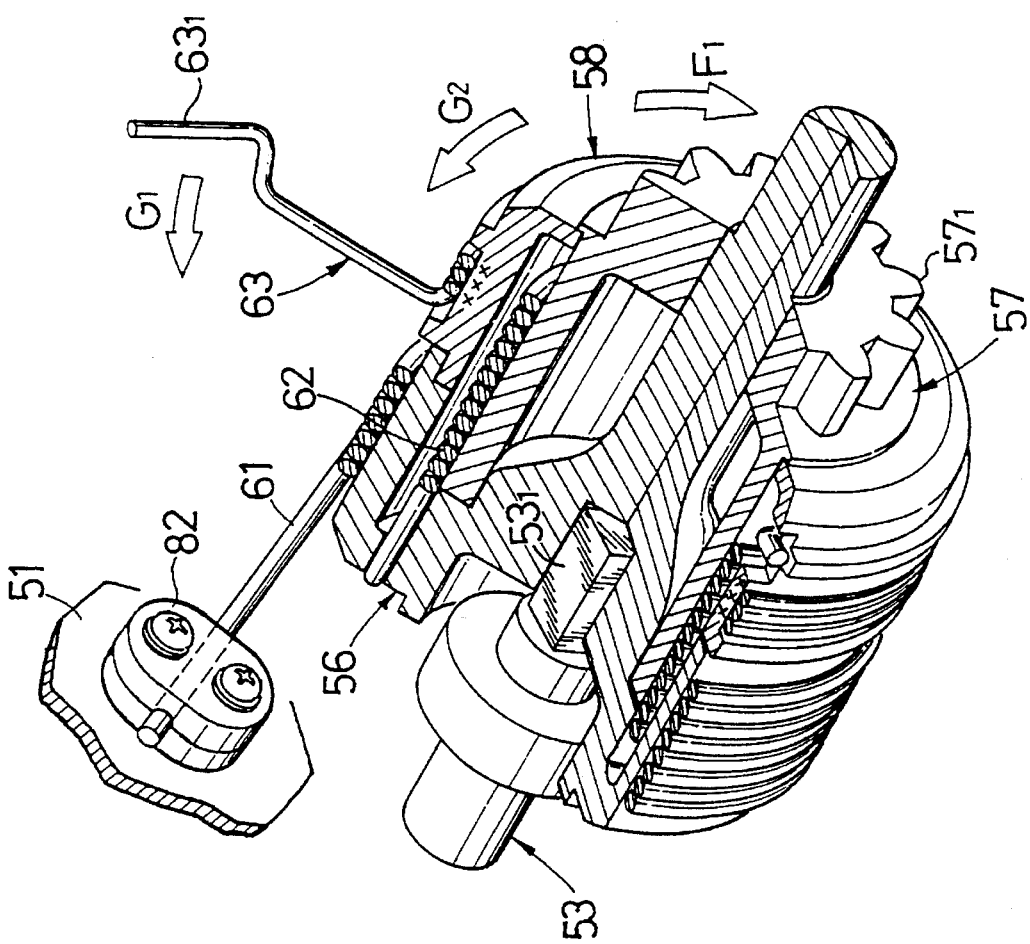
FIG. 14 is a view for explaining the operation when the brake is released.

When the motor 20 is driven to rotate the input shaft 53, in the direction of an arrow $G_1$ in FIG. 13, in order to electrically operate the parking brake system P, the drive roller 56, integral with the input shaft 53, is also rotated in the direction of an arrow $G_2$. The rotation of the driver roller 56, in the direction of the arrow $G_2$, causes the drive lock spring 62 to be contracted in diameter, thereby uniting the driven roller 57 with the drive roller 56 to rotate the driven roller 57 in the direction of an arrow $G_3$. It should be noted that the rotation of the drive roller 56, in the direction of the arrow $G_2$, causes the clutch spring 61 to be expanded in diameter, and hence, the rotation of the drive roller 56 is performed without hindrance. Thus, the base end-side member 72 of the pedal 10 is turned in the direction of the arrow A in FIG. 7 to reach the operative position b shown by the dashed line through the sector gear 60 meshed with the pinion $57_1$ of the driven roller 57.

When the base end-side member 72, of the brake pedal 10, has reached the operative position, the driving of the motor 20 is stopped, and the base end-side member 72 of the brake pedal 10 is locked at the operative position (see FIG. 12), as in the case where the brake pedal 10 has been operated manually.

Even when the brake pedal 10 has been turned in the direction of the arrow A in FIG. 7, as described above, the resilient force of the pedal return spring 14 is balanced with the resilient force of the folding spring 76, when the brake pedal 10 has reached the position c. Thereafter, with the tip end-side member 73 left at the position c, only the base end-side member 72 is turned in the direction of the arrow A. This prevents the driver's foot from being caught between the tip end-side member 73 and the vehicle body panel 1.

To release the operation of the parking brake system P, the manually releasing arm 65 may be turned in the counterclockwise direction, as viewed in FIG. 7, by the release cable 68, or the automatically releasing arm 66 may be turned in the counterclockwise direction, as viewed in FIG. 7, by the rod 71 connected to the actuator 70. This causes the engagement portion $65_1$ of the manually releasing arm 65, or the engagement portion $66_1$ of the automatically releasing arm 66, to urge the operating end $63_1$ of the releasing lock spring 63 in the direction of arrow $G_1$, in FIG. 14, to contract the releasing lock spring 63. As a result, the release roller 58, united with the releasing lock spring 63, is turned in the direction of arrow $G_2$ to expand the drive lock spring 62 locked at one end to the release roller 58. When the drive lock spring 62 has been expanded in diameter, the driven roller 57 is separated from the drive roller 56, and the brake pedal 10, biased by the resilient force of the pedal return spring 14, is returned to the inoperative position, while rotating the driven roller 57, in the direction of arrow $F_1$, through the sector gear 60.

At this time, the resilient force of the pedal return spring 14 is gradually reduced with the turning movement of the brake pedal 10 in the direction of the arrow B in FIG. 7 and hence, the tip end-side member 73 is separated from the stopper 80 of the base end-side member 72 and turned to the position to abut against the pin 75 by the resilient force of the folding spring 76.

Although the embodiments of the present invention have been described in detail, it will be understood that the present invention is not limited to these embodiments, and various modifications in design may be made without departing from the spirit and scope of the invention defined in claims.

For example, the brake pedal 10 has been exemplified as the brake operating member in these embodiments, but the brake operating member may be a brake lever operated by the driver's hand. In addition, the drive source is not limited to the electric motor 20, but may be a hydraulic cylinder or a hydraulic motor.

As discussed above, according to the first feature of the invention, when the brake operating member is automatically operated by the drive source, the limiting means limits the movement of at least a portion of the brake operating member and hence, the driver's foot or hand is prevented from being caught by the brake operating member.

According to the second feature, the driving member connected to the drive source and the brake operating member are releasably connected to each other through the locking member, so that the locking connection through the locking member is released by the limiting means. Therefore, during the automatic operation, the brake operating member can be separated from the driving member to reliably prevent the driver's foot or hand from being caught by the brake operating member.

According to the third feature, the brake operating member is comprised of the end-side member connected to the drive source, and the tip end-side member operated by the driver, both of which members are pivotally supported by a folding shaft. Therefore, during the automatic operation, the tip end-side member can be folded about the folding shaft by the limiting means to reliably prevent the driver's foot or hand from being caught by the brake operating member.

What is claimed:

1. A parking brake system operable by manually operating a brake operating member by a driver, and operable by automatically operating the brake operating member by a drive source, said system comprising limiting means for limiting the movement of at least a portion of the brake operating member toward a brake force applying position of said brake operating member during an automatic operation of the brake operating member by the drive source, wherein said brake operating member comprises a base end-side member connected to the drive source, and a tip end-side member operated by a driver, said base end-side and tip end-side members being pivotally supported by a folding shaft, and wherein during automatic operation of said brake operating member, the limiting means permits the tip end-side member to be folded about the folding shaft.

2. A parking brake system according to claim 1, further including a driving member connected to the drive source, said driving member and said brake operating member being capable of engaging with and disengaging from each other through a locking member, and wherein during automatic operation of said brake operating member, the limiting means releases a locking connection through the locking member to separate the brake operating member from the driving member.

3. A parking brake system according to claim 1, wherein said brake operating member is operated by a foot of a driver.

4. A parking brake system according to claim 1, wherein said drive source is a motor.

5. A parking brake system according to claim 2, further comprising a cam member, and the locking connection of said locking member is released by an action of said cam member.

6. A parking brake system according to claim 1, further comprising a casing, a return spring stretched between said tip end-side member and said casing, and a folding spring mounted on said folding shaft.

7. A parking brake system according to claim 1, further comprising a stopper mounted on said base end-side member for limiting a turning movement of said tip end-side member.

8. A parking brake system according to claim 3, wherein said system is mounted on a vehicle body panel.

9. A parking brake system operable by manually operating a brake operating member by a driver, and operable by automatically operating the brake operating member by a drive source, said system comprising:

limiting means for limiting the movement of at least a portion of the brake operating member toward a brake force applying position of said brake operating member during an automatic operation of the brake operating member by the drive source; and a driving member connected to the drive source, said driving member and said brake operating member being capable of engaging with and disengaging from each other through a locking member, and wherein during automatic operation of said brake operating member, the limiting means releases a locking connection through the locking member to separate the brake operating member from the driving member, wherein said driving member and said brake operating member are supported on a common shaft.

* * * * *